United States Patent
Jartyn

(10) Patent No.: US 9,563,181 B2
(45) Date of Patent: Feb. 7, 2017

(54) METHOD FOR OPERATING AN AUTOMATION SYSTEM

(75) Inventor: Hermann Jartyn, Igensdorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 643 days.

(21) Appl. No.: 13/570,929

(22) Filed: Aug. 9, 2012

(65) Prior Publication Data

US 2013/0218300 A1  Aug. 22, 2013

(30) Foreign Application Priority Data

Aug. 12, 2011  (EP) .................................. 11177366

(51) Int. Cl.
*G05B 11/01* (2006.01)
*G05B 19/042* (2006.01)
*G05B 19/418* (2006.01)

(52) U.S. Cl.
CPC ........... *G05B 11/01* (2013.01); *G05B 19/0426* (2013.01); *G05B 19/41845* (2013.01); *G05B 2219/31099* (2013.01); *G05B 2219/31167* (2013.01); *Y02P 90/16* (2015.11)

(58) Field of Classification Search
CPC .......................................... G05B 2219/31099
See application file for complete search history.

(56) References Cited

U.S. PATENT DOCUMENTS

| | | |
|---|---|---|
| 6,993,409 B2 | 1/2006 | Jartyn |
| 2009/0072986 A1* | 3/2009 | Bussert et al. ................ 340/679 |
| 2010/0039952 A1 | 2/2010 | Lenz |
| 2010/0211201 A1 | 8/2010 | Papenfort et al. |
| 2010/0217894 A1 | 8/2010 | Papenfort et al. |

FOREIGN PATENT DOCUMENTS

| | | |
|---|---|---|
| CN | 1726440 A | 1/2006 |
| DE | 100 55 168 A1 | 2/2002 |
| DE | 10 2007 039 425 A1 | 2/2009 |
| DE | 10 2007 039 428 A1 | 2/2009 |
| EP | 1 046 972 A1 | 10/2000 |
| EP | 2 157 536 A2 | 2/2010 |

* cited by examiner

*Primary Examiner* — Sean Shechtman
(74) *Attorney, Agent, or Firm* — Henry M. Feiereisen LLC.

(57) ABSTRACT

In a method for operating an automation system having a first central unit and a second central unit connected with one another for communication and several automation devices connected for communication to the second central unit, information relating to a plurality of communication channels arranged between the second central unit and a respective automation device is compiled in a communication data record, and information relating to communication relationships with the plurality of communication channels and the respective automation device that can be accessed via the plurality of communication channels is automatically transmitted to the first central unit, based on a communication data record.

8 Claims, 5 Drawing Sheets

METHOD FOR OPERATING AN AUTOMATION SYSTEM

CROSS-REFERENCES TO RELATED APPLICATIONS

This application claims the priority of European Patent Application EP11177366 filed Aug. 12, 2011, pursuant to 35 U.S.C. 119(a)-(d), the content of which is incorporated herein by reference in its entirety as if fully set forth herein.

BACKGROUND OF THE INVENTION

The present invention relates to a method for operating an automation system, in particular a distributed automation system.

The following discussion of related art is provided to assist the reader in understanding the advantages of the invention, and is not to be construed as an admission that this related art is prior art to this invention.

The term "automation device" includes all devices, facilities or systems, in other words in addition for instance to controllers, such as programmable logic controllers, process computers, (industrial) computers, decentralized peripherals, operating and observation devices and suchlike also drive or other aggregate controllers, frequency converters and similar, as are or can be used to control, regulate and/or monitor technological processes, for instance for shaping or transporting material, energy or information etc., wherein energy is expended or converted in particular by way of suitable technical facilities, like for instance sensors or actuators.

In an automation solution having a central unit and several automation devices connected thereto for communication purposes, depending on the type and number of connected automation devices, a significant complexity of the resulting automation system is produced. This complexity increases again when different types of connection, in other words different communication media and/or different communication protocols are used to connect the automation devices. By way of example, reference is made here to a situation in which the respective automation devices are connected to three different networks, e.g. Profibus, Profibus Integrated and Profinet etc.

The aforementioned complexity increases again when an additional central unit (first central unit), which is to access the automation devices connected to the other central unit (second central unit), is connected to the central unit mentioned by way of example for communication purposes. Project planning of the communication relationships and communication paths/transport channels/communication channels, subsequently referred to in summary as communication channel, must then take place between the second central unit and at least the automation devices relevant to the first central unit and also to the first central unit, so that the effort involved in the project planning of the second central unit is repeated or at least essentially repeated for the first central unit. In addition, repetition of such project planning is prone to error and any errors which might occur in such cases can only be found with difficulty.

It would therefore be desirable and advantageous to obviate prior art shortcomings and to provide an improved method for operating an automation system having at least two central units and a plurality of automation devices connected to the second central unit, in which the aforementioned disadvantages are eliminated, or their adverse effects are at least reduced.

SUMMARY OF THE INVENTION

According to one aspect of the present invention, a method for operating an automation system having a first central unit and a second central unit connected with one another for communication and a plurality of automation devices connected for communication to the second central unit includes the steps of compiling, in a communication data record, information relating to a plurality of communication channels arranged between the second central unit and a respective automation device, and automatically transmitting to the first central unit, based on a communication data record, information relating to communication relationships with the plurality of communication channels and the respective automation device that can be accessed via the plurality of communication channels.

The aforementioned communication data record is a direct or indirect result of project planning the second central unit and the automation devices connected thereto. The term communication data record is to be understood here both as the summary of all communication-relevant data in a data record including all project planning data for instance and also as reference to a separate data record obtained from such a project planning data record for instance. By information relating to a plurality of communication relationships with communication channels and the automation device which can be achieved thereby in each instance being transferred with the aid of the communication data record to the first central unit, there is no need, on the part of the first central unit, to have to once again perform the project planning performed for the second central unit, which forms the direct or indirect basis of the communication data record, again. In this way information relating to the communication data record can be automatically transferred to the first central unit in its entirety. It may however also result that individual communication relationships between the second central unit and the respective automation device are not relevant to the project planning of the first central unit, so that data relating thereto does not require transfer to the first central unit, it thereby being sufficient for information relating to a plurality of communication relations, but possibly not all communication relationships with respect to which information is found in the communication data record, to be automatically transmitted with the aid of the communication data record to the first central unit. In short, this aspect of the invention is an automatic transfer of project planning data of the second central unit to the first central unit, so that a project planning of the first central unit can take place on the basis of this data, wherein, an automatic evaluation of the transmitted data is also possible for instance, so that the project planning of the first central unit likewise at least partly takes place automatically on the basis of the transmitted data.

The communication data record as a result of the project planning of the second central unit is produced largely automatically when a project planner of the first central unit and of the network of the automation devices to be connected thereto plans the automation devices to be used and the communication channels and communication relationships existing in each instance between these and the second central unit into the project on an engineering system or another project planning tool. With such project planning, names of the respective automation devices are determined for instance or names are automatically generated with the aid of type designation of such automation devices. Furthermore, such project planning determines whether the respective automation device is directly connected to the second central unit or whether the respective automation device is located in a so-called subnetwork and in this respect is directly connected to the second central unit, namely by way of another automation device, from which this subnetwork emanates. Finally, an address of the respective automation device is automatically or manually determined, by way of which the automation device can be reached for data transmissions during operation of the automation system. As this data is an integral part of the communication data record and as such is automatically transmitted to the first central unit as information relating to a plurality of communication relationships, the essential communication-relevant project planning data of the second central unit is also available to the first central unit.

According to an advantageous feature of the present invention, a communication module may be created for the first central unit with the aid of the communication data record. The communication module is a software module in a control program for the first central unit. The communication module receives at least a specific number of inputs, when necessary a specific number of inputs and the same number of outputs on account of the data of the communication data record. This number corresponds to the number of communication channels in the communication data record or the number of communication channels relevant to the first central unit in the communication data record. The communication module enables data to be transmitted from the first central unit to an automation device connected for communication purposes to the second central unit, by the first central unit transmitting the data to be transmitted to the communication module by using the input corresponding to the respective communication channel. The communication module then transfers the transmission to the respective automation device, with the aid of the data from the communication data record. An output is combined with each input in order to operate the usually bidirectional communication channels, so that the output functions as an endpoint of a communication channel used to transmit acknowledgements or suchlike for instance.

In technical terms, a plurality of inputs and/or outputs for a software module in a control program may also be referred to as a slot, so that the transfer of data from the first central unit to an automation device connected to the second central unit can also be summarized as the transmission of the respective data by the first central unit to precisely one such slot in the communication module. It is essential here that the communication module within the first central unit is a representative of the second central unit and a plurality of automation devices which are connected thereto for communication purposes. The network emanating from the second central unit having the communication channels included therein and automation devices connected thereto reduces for the first central unit at a central point, namely the communication module. In order consequently to be able to trigger a dedicated communication with precisely one automation device in the network emanating from the second central unit, an input and/or output, in other words a slot, of the communication module is provided for each automation device of this type and the communication channel leading therein. The activation of an automation device in the external network thus reduces from the point of view of the first central unit in terms of the activation of the respective input/of the respective slot of the communication module. A possible complexity of the external network is therefore completely transparent for the first central unit. The required type of transmission and the communication channel is selected by the communication module itself, namely with the aid of the information obtained with the communication data record. When the communication module is accessed at a specific input/slot, it therefore indicates at which automation device of the external network a communication relationship is needed. With the aid of this data, the communication channel pertaining to the respective automation device, its target addresses etc. can be determined from the information obtained with the communication data record, so that the communication module can trigger the actual transmission of the data transferred to its input/to its slot initially to the second central unit and then to the respective automation device.

According to another advantageous embodiment of the present invention, the information relating to a plurality of communication channels between the second central unit and a respective automation device may be assembled in the communication data record with a unique identifier for each communication channel in each instance and for the communication data record to be interpreted by the first central unit and for the respective data of the communication data record to be transferred into the automation solution for the first central unit with the aid of the identifier and a corresponding identifier used in an automation solution for the first central unit. By the data of the communication data record being immediately transferred into the automation solution for the first central unit, it is immediately available to a programmer, who creates or extends the automation solution for the first central unit. Since the transfer takes place with the aid of two identifiers, namely with the aid of an identifier predetermined for a communication channel to an automation device within the scope of project planning of the second central unit and a corresponding identifier in project planning of the first central unit with respect to communication relationships/communication channels pertaining to the automation devices in the external network, an immediate assignment of the information automatically transferred to the first central unit takes place with the communication data record. A programmer of the automation solution for the first central unit can therefore inspect information obtained using the communication data, namely with the aid of the respective identifier.

When programming or project planning a data transmission emanating from the first central unit to an automation device in the external network, the programming/project planning may be checked with the aid of the communication data record and the identifier. The two identifiers result as follows: during the project planning of the communication channels starting from the second central unit, an identifier results for each communication channel and its communication endpoint and for the respective automation device. An identifier likewise results during the project planning of the communication channels emanating from the first central unit having possibly one communication endpoint in the external network. When access to the communication data record and there the data identified with a corresponding identifier now takes place with the aid of the identifier obtained during the project planning of the first central unit, the correct use or usability of specific parameters, addresses etc. can be checked for this communication relationship. The address of the respective communication endpoint results from the communication data record during access with the respective identifier for instance. This address must also be used during the programming of the communication relationship emanating from the first central unit. The control possibility with the aid of the communication data record therefore either supplies the necessary data for the programmer with no great effort or enables the programmer to check the correct use of addresses and other parameters in program code instructions which are already applied to the communication relationship.

According to another advantageous embodiment of the present invention, the communication data record may be automatically created from a project planning data record, which describes the second central unit and the automation devices directly or indirectly connected thereto and the communication channels existing between the first central unit and each automation device. The project planning data record may then be produced successively with the project planning of the second central unit and the communication network emanating therefrom having respective automation devices connected thereto. The automatic generation may take place by the project planning data record being searched for communication-relevant data. All communication-relevant data can then be transferred into the communication data record or marked for transfer into the communication data record. There is the possibility here to influence the scope of the transfer of the data from the project planning data record in the communication data record, for instance by individual automation devices and/or communication channels being exempt from a transfer into the communication data record or being selected especially for transfer into the communication data record. Such a selection can be graphically supported, by a topology of the planned communication network being displayed on a monitor or other display device and individual communication channels or automation devices being selected for a transfer into the communication data record or for exclusion from a transfer into the communication data record.

According to another advantageous embodiment of the present invention, data may be identified in the project planning data record for automatic generation of the communication data record from the project planning data record, with the data describing a communication endpoint, in other words for instance an automation device functioning as a communication endpoint. With a graphic or otherwise suitable selection for transfer or exclusion of the transfer into the communication data record, the data belonging to the respective communication endpoint, in other words its address and/or data relating to a communication channel pertaining to the respective automation device, is transferred into the communication data record or excluded from such a transfer. A possible method considered for graphical selection is marking of an item for transfer or removal of such marking by the currently normal activation or clicking with a pointing device, possibly also in the form of a so-called double click or suchlike.

According to another advantageous embodiment of the present invention, at least part of the communication channels may be Profisafe connections and precisely one input and/or output (slot) may be applied in the communication module for each endpoint of a Profisafe connection of the communication data record. Then at least the Profisafe connections, which satisfy a predetermined security standard, such as IEC 61784-3-3, are routed exclusively via the communication module during their use by first central unit, so that when the communication module fulfills the same security standard, the communication relationship emanating from the first central unit is on the whole adequate for the security rules provided for Profisafe.

With respect to the transfer of the data of the communication data record in the region of the first central unit with the aid of the identifier provided for each communication channel and a corresponding identifier in an automation solution for the first central unit, the transfer may take place in comments of the automation solution for the first central unit. Such comments are readily available for inspection by the programmer of the automation solution for the first central unit, without influencing the functionality of the automation solution in any other way. In the event of possible discrepancies between the data from the communication data record and corresponding data in the automation solution for the first central unit, the mere transfer into comments can therefore never result in a malfunction of the automation solution for the first central unit. With the aid of the comments, the programmer is able to orientate him/herself at any time, to determine whether during use of a communication channel in the external network for transferring data to or from the respective automation device, the correct data and parameters were used, by the data and parameters used in the automation solution being compared to data automatically transferred into a comment of the automation solution in accordance with the project planning data record.

Advantageously, the method and its embodiments as described here and subsequently may particularly be considered for an automation system having a fail-safe central unit as a first central unit and an embodiment of the communication module as a fail-safe communication module. When it was namely outlined in the introduction that the project planning of extensive communication networks is costly and prone to failure, it nevertheless applies all the more when the networks and software provided for their use has to be embodied in a more fail-safe fashion. The complexity in the transfer of such project planning for project planning of a failsafe central unit thus once again increases very significantly. Against this background, the constellation with a failsafe central unit as a first central unit is above all beneficial, such that the communication module, which is embodied as a failsafe communication module in a failsafe central unit, functions as a representative of the completely external network and this network is then reduced for the failsafe central unit to the communication module with its inputs and/or outputs (slots). From the failsafe first central unit's point of view, the external network is thus more or less encapsulated in the failsafe communication module. The fail safety of the communication module need only be ensured once, in order then to be reusable at any time for different external networks, since it is not the functionality of the failsafe communication module but instead only the parameterization of the communication channels formed by the slots which are affected by a change in the external network.

According to another aspect of the invention, an automation device or a central unit in such an automation device, especially a central unit of a programmable logic controller or an NC controller or suchlike, in other words central units, as referred to herein as the first and second central unit, operate to carry out the described method and include means for implementing the method. The invention is preferably implemented here in software. The invention is thus, on the one hand, also a computer program having program code instructions which can be executed by a computer and, on the other hand, a non-transitory storage device having a computer program of this type as well as also an automation device having such a central unit or such a central unit in the memory of which such a computer program is or can be loaded for implementing the method and its embodiments.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
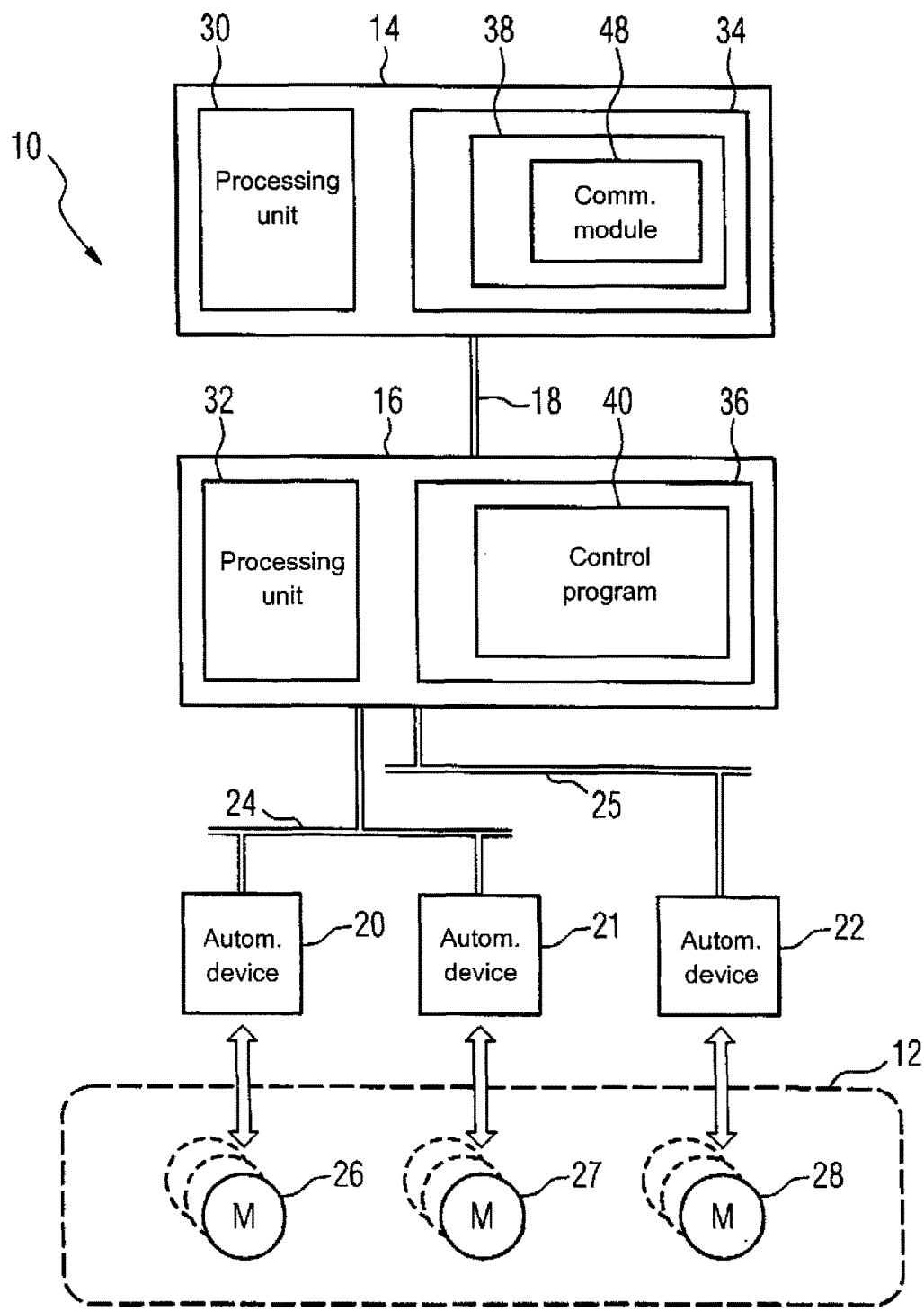
FIG. 1 shows a distributed automation system according to the present invention having a first and a second central unit.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an automation system designated overall with 10. FIG. 1 shows a schematically simplified diagram of a distributed automation system 10 which is configured to control and/or monitor a technical process 12 which is not shown in more detail. The automation system 10 includes a first central unit 14 and a second central unit 16. A communication connection 18, e.g. in the form of a bus connection, in particular a field bus connection, exists between the two central units. The first and/or second central unit 14, 16 are for instance central units of a programmable logic controller or an NC controller which are known per se.

The second central unit 16 can be connected to a plurality of automation devices for communication purposes and is shown here as connected for communication to a first, second and third automation device 20, 21, 22. The relevant connections 24, 25 are likewise bus connections, in particular field bus connections. Motors 26, 27, 28 are connected to each automation device 20, 21, 22, which in specialist terminology may be drive control units designated as drive objects, as actuators or sensors assigned to the technical process 12 in the example shown.

Each communication connection 24, 25 between the second central unit 16 and an automation device 20-22 is referred to here and below also as a communication channel. The totality of the communication channels and the automation devices 20-22 functioning in each instance as a communication endpoint is referred to here and below, if necessary including the second central unit 16, as a communication network or communication network, provided from the perspective of the first central unit 14 this considers this communication network to be an external communication network.

Each central unit 14, 16 includes a processing unit 30, 32 in the form of or in the manner of a microprocessor as well as a memory 34, 36. A computer program, namely a control program 38, 40, is charged in the memory 34, 35 as a respective automation solution. During operation of the respective central unit 14, 16, the respective control program 38, 40 is embodied by the respective processing unit 30, 32, thereby affecting the respective control and/or monitoring of the technical process 12.

Figure 2:
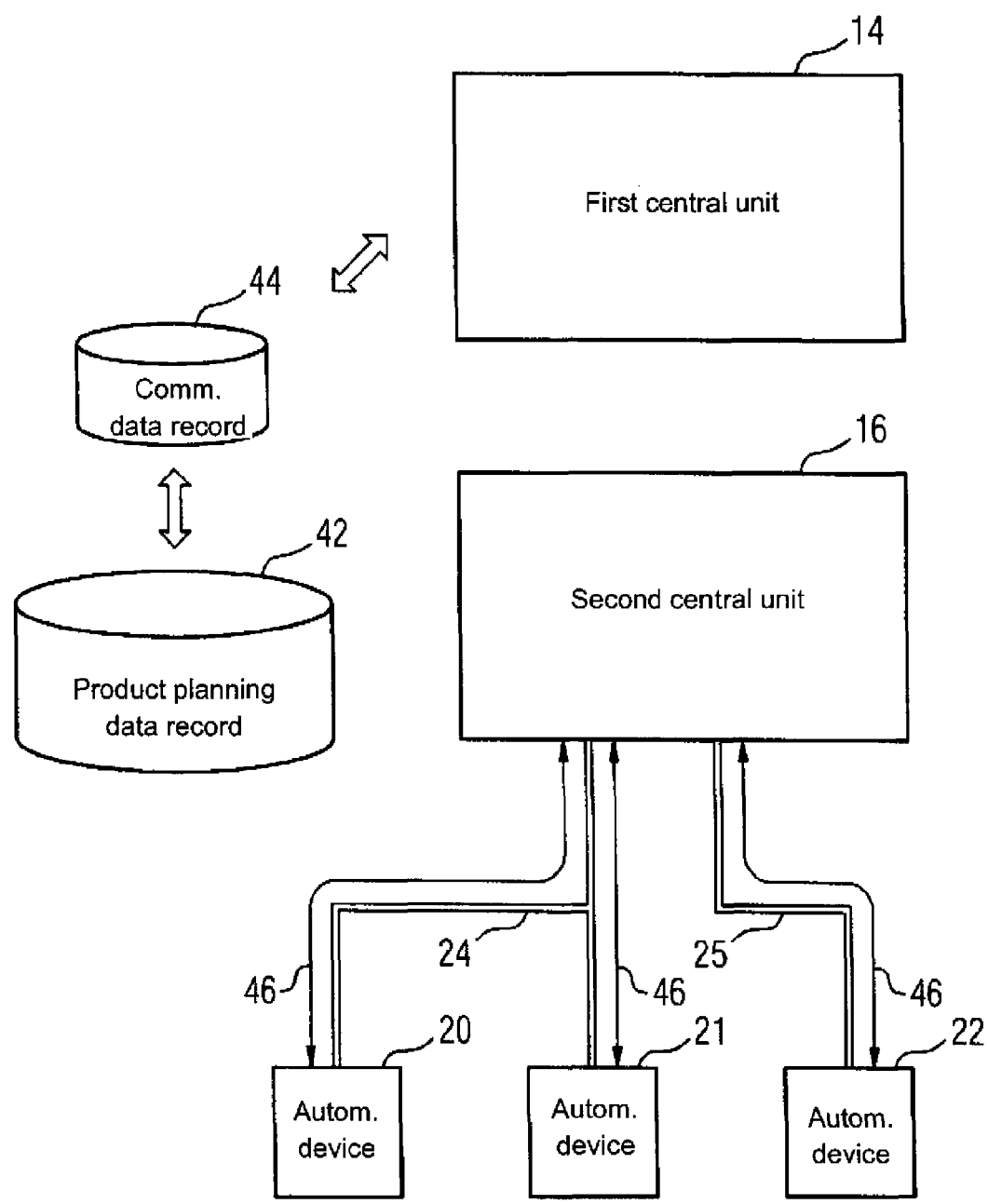
FIG. 2 shows another representation of the automation system according to FIG. 1 having further details.

FIG. 2 refers to part of the representation from FIG. 1, however with fewer details. A project planning data record 42 is shown, in which data (not shown in more detail) is assembled for project planning of the second central unit 16 and the network (FIG.) emanating therefrom. A communication data record 44 can be produced from the project planning data record 42 or in another suitable way. Such creation can take place automatically, by for instance the data summarized in the planning data record 42 being searched for a mention, which identifies the respective data as communication-relevant and the corresponding data is transferred into the communication data record 44. If the communication data record 44 is not generated as a data record which is independent of the planning data record 42, the communication data record 44 may then also be summarized as a subset of the planning data record 42 and form an integral part of the planning data record 42. Without dispensing with its further general applicability, the description presented here is continued for the assumption of a separate communication data record 44 derived from the project planning data record 42.

The project planning data record 42 describes the second central unit 16, the automation devices 20-22 connected directly or indirectly thereto and the communication channels 46 existing between the second central unit 16 and each automation device 20-22, which, for the sake of clarity, are shown here in addition to the underlying connections 24, 25, although only one communication channel 46 via an also physically existing communication connection 24, 25 is actually naturally conceivable.

The communication data record 44 includes information relating to all communication channels 46 between the second central unit 16 and a respective automation device 20-22 or at least information relating to a plurality of communication channels 46 of this type. With the aid of the communication data record 44, information relating to a plurality of communication relationships having communication channels 46 and the automation device 20-22 which can be achieved in each instance thereby is automatically transferred to the first central unit 14, as shown schematically in FIG. 2 by the diagonal block arrow.

One particular type of transmission of information of this type relating to a plurality of communication relationships emanating from the second central unit 16 consists in a communication module 48 (FIG. 1) being created for the first central unit 14 with the aid of the communication data record 44. This communication module 48 is for instance an integral part of the control program 38 in the memory 34 of the first central unit 14.

Figure 3:
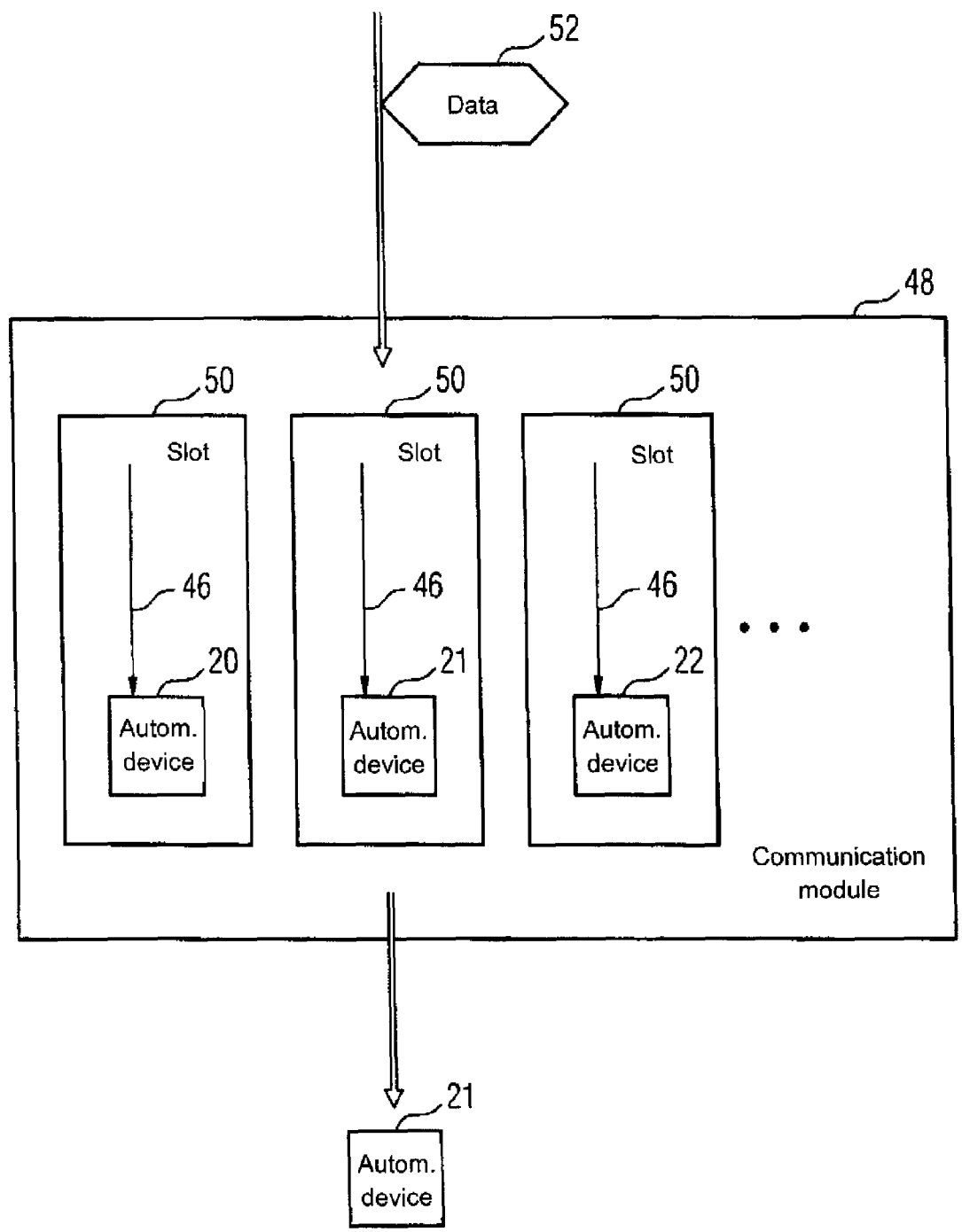
FIG. 3 shows a representation of a communication module functioning as a virtual representative of the second central unit and communication peripherals connected thereto and communication endpoints achievable thereby.

FIG. 3 shows the communication module 48 in an enlarged representation having further details, nevertheless shown schematically greatly simplified. Accordingly, the communication module 48 includes a plurality of inputs and/or outputs which are referred to below as slots 50. The slots 50 in the block diagram of the communication module 48 according to FIG. 3 are likewise only shown as block and are software inputs, if necessary combined software inputs and outputs, of the communication module 48, in other words different possibilities of activating the communication module 48 from the control program 38 (FIG. 1). The number of slots 50 of the communication module 48 corresponds to the number or the relevant number of communication channels 46 in the communication data record (FIG. 2).

In the representation according to FIG. 3, the fact that a slot 50 is provided in the communication module 38 for each communication channel 46 and the automation device 20-22 forming its communication endpoint is shown symbolically by a number of slots 50 corresponding to the number of automation device 20-22 shown in FIG. 1. Corresponding parameters are actually stored for each slot 50, said parameters describing the communication channel 46 and the respective communication endpoint, in other words in particular the automation device 20-22 there. Data 52 is transmitted by the first central unit 14, e.g. to the second automation device 21 which is connected for communication purposes to the second central unit 16, by the first central unit 14 transferring the data 52 to be transmitted using the slot 50 corresponding to the respective communication channel 46 to the communication module 48 and the communication module 48 transferring the transmission to the respective automation device 21 with the aid of the data from the communication data record 44. This transmission is shown in the representation by the vertical arrow to the respective slot 50 and starting from this. The transmission of data 62 by the communication module 48 with the aid of data from the communication data record 44 either means access of the communication module 48 to the data in the communication data record 44 at the point in time of the transmission or in conjunction with the transmission or access of the communication module 48 to internal data of the communication module 48, which was transferred with the aid of the data of the communication data record 44 as a parameter for the communication module 48, in particular as a parameter for its slot 50.

Figure 4:
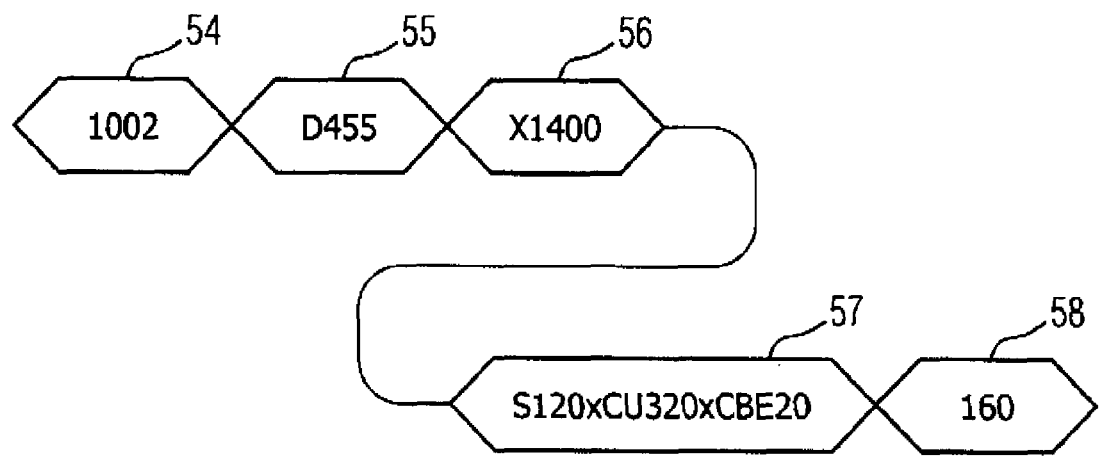
FIG. 4 shows a representation of a textual description of a communication channel.

FIG. 4 shows a possible form of representation of a communication channel 46 (FIG. 2). This includes an identity number referred to below as identifier 54, here "1002", a label of the central device or of the central unit, from which the communication channel 46 emanates, here "D455", to which reference is made in the following as the first device label 55, a final label 56, here "X1400", a second device label 57 for referencing a decentralized device, here "S120xCU320xCBE20", in other words the respectively connected automation device/communication endpoint and a target address 58.

Such in particular textual representations of a communication channel 46 are for instance generated automatically during project planning of the second central unit 16 with a corresponding development tool, in other words for instance a so-called engineering system. Such a representation of the communication channel 46 describes or identifies this clearly. The description combines transport and device type information. The transport information, consisting of the identity number 54 of the communication channel 46 and the target address 58 of the respective automation device 20-22, identifies the start and endpoint of the communication channel 46. The device type information 55, 56, 57 contains the device topology. This usually concerns hierarchical descriptions of network topologies with if applicable different sub networks, e.g. PROFIBUS, PROFIBUS Integrated, PROFINET, and a plurality of automation devices 20-22 functioning for instance as control devices and further automation devices 20-21 functioning as drive devices. All network topologies are simplified to a uniform representation model of the central device, decentralized device and endpoint in the form of a final designation. This description of a communication channel 46 may also be summarized as a topological project reference. It includes an instance-specific communication path 55, 58 and a type-dependent device part 56, 57. As a result, it can be worded such that a communication relationship is to take place for instance with the first central unit 14 or the communication module 48 there up to the communication endpoint via the devices included in the description.

Bus addresses, device numbers, device names or logical addresses are normally not used for such a topological project reference. As a result, the topological part is maintained with little or no changes. With changes of such parameters, the different projects must always be updated. The identity number functioning as an identifier 54 and the target address 58 must conversely correspond currently with the project planning.

This or similar data (FIG. 4) also form the basis of the communication module 48 (FIG. 3) and its slot (50), if data 52 is sent to one of the slots 50 by the first central unit 14 and the communication module 48 automatically forwards the transmission of the obtained data 52 to the automation device represented by the slot 50, with the aid of the slot 50 used, and uses at least the thus encoded target address 58 therefor. With a plurality of central units connected to the first central unit 14, such as is shown in FIG. 1 and FIG. 2 for only one further central unit, namely the second central unit 16, at least the first device designation 55 is still used to transmit the data to be transmitted to the starting point of the respective external network for the selection of the external central unit, by way of which the respective communication endpoint, in other words the respective automation device, can be reached.

Figure 5:
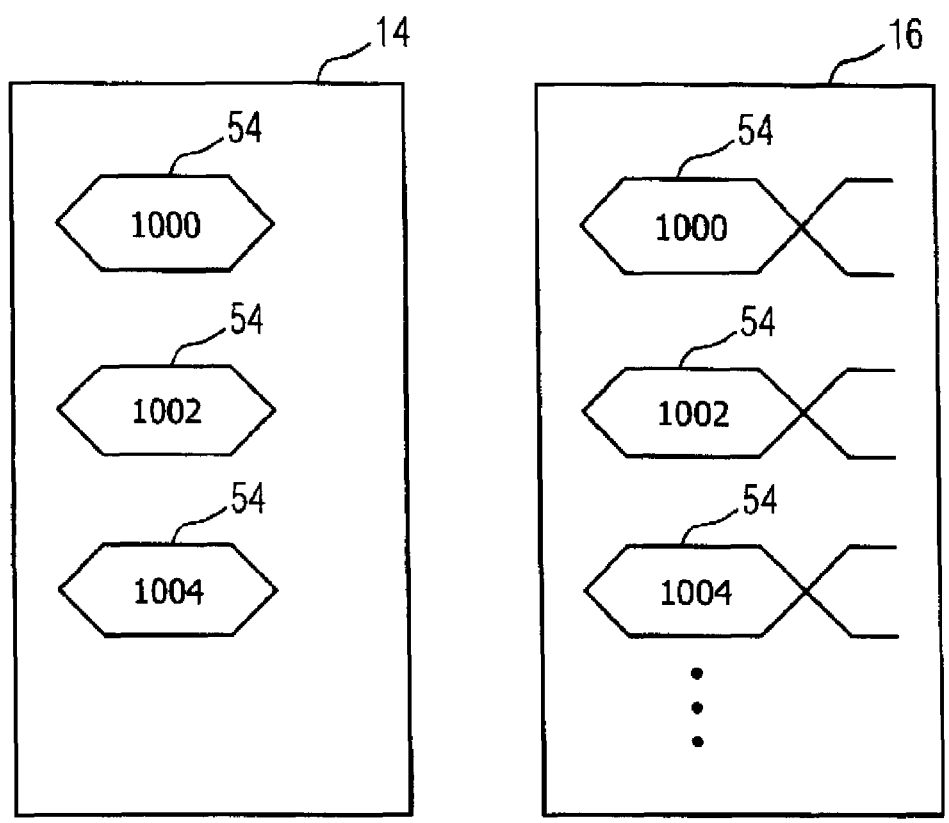
FIG. 5 shows a representation to illustrate an assignment of planned communication relationships.

FIG. 5 shows a schematic representation reduced to a few details, such that a plurality of descriptions of communication channels 46 is produced on the part of the second central unit 16 within the scope of project planning of the second central unit 16 and the communication network emanating therefrom, as is shown by way of example in FIG. 4. Each description of this type is identified by a clear identifier 54 ("1000", "1002", "1004", . . . ). On the part of the first central unit 14, similar descriptions of the communication channels 46 are stored and similarly provided with an identifier 54 in order to provide access to the communication channels 46 emanating from the second central unit 16 in project planning of the first central unit 14.

The identifier 54 is based on the clear target address 58. The clearness of the target address 58 is ensured by an algorithm, which is used as a functionality for instance of an engineering system both during the project planning of the first central unit and also during the project planning of the second central unit and during the project planning of each further central unit. As all plans created relating to the automation system 10 (FIG. 1) are processed and/or treated with the same tool, the same calculation of the target address 58 and thus its clearness in the entire resulting network is always ensured.

The identifiers 54 used on the part of each central unit 14, 16 allow for an assignment of the descriptions of the communication channels 46, e.g. by the information relating to a plurality of communication channels 46 between the second central unit 16 and a respective automation device 20-22 being assembled in the communication data record 44 with a clear identifier 54 for each communication channel 46 in each instance being assembled in the communication data record 44 and by the communication data record 44 being imported by the first central unit and the respective data of the communication data record 44 being transferred for the first central unit 14 with the aid of the identifier 54 and a corresponding identifier 54 used in a project planning or automation solution for the first central unit 14. The representation in FIG. 4 with data shown there describing a communication channel 46 may be summarized as an excerpt from the contents of the communication data record 44.

Figure 6:
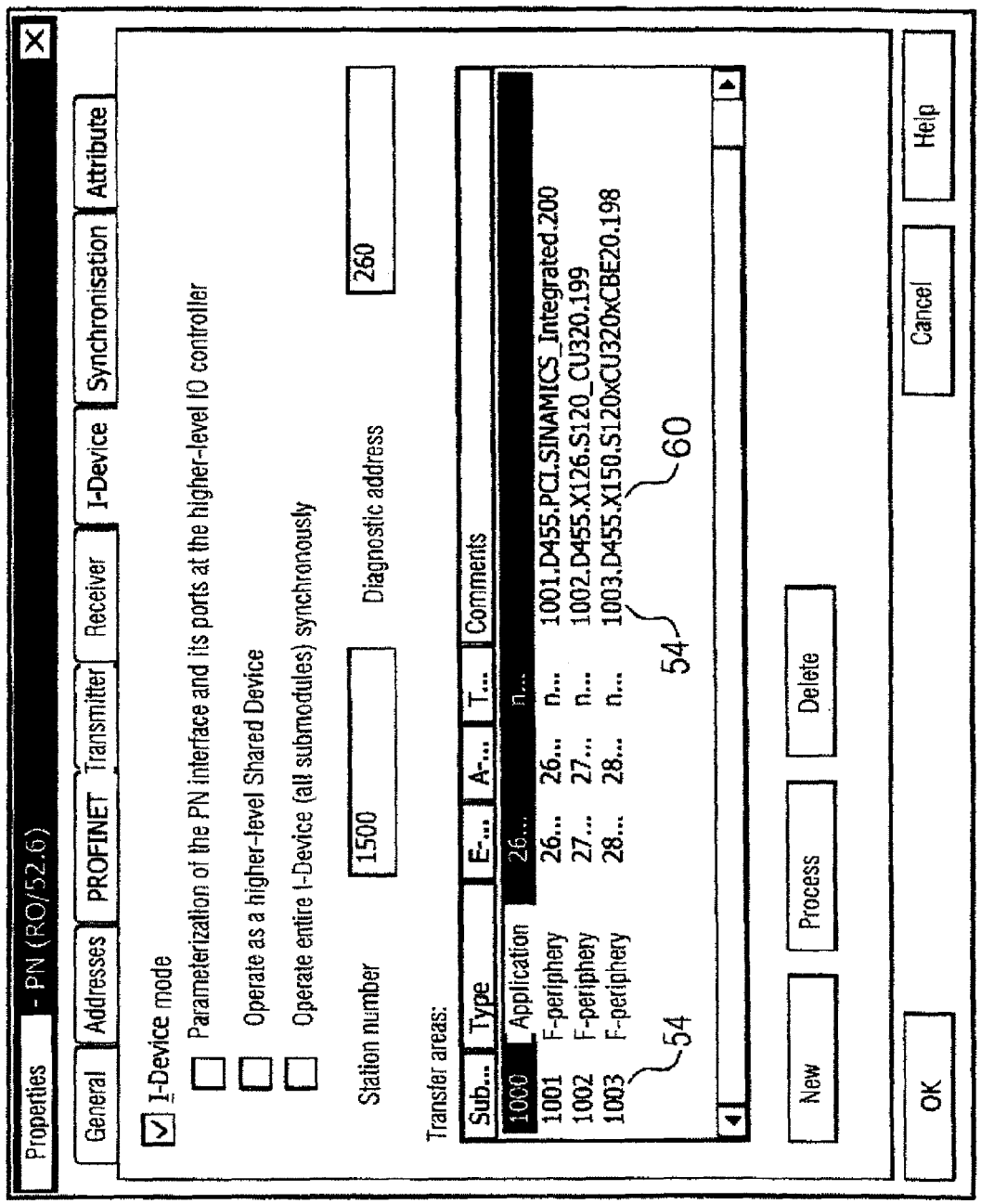
FIG. 6 shows representation to illustrate one possibility of presenting imported and assigned data so as to describe a communication channel.

FIG. 6 shows a transfer of the data of the communication data record 44 in the automation solution for the first central unit 14 in comments 60 of the automation solution, wherein it can be identified that the assignment in each instance of a comment 60 to communication relationships planned in the automation solution of the first central unit 14 takes place with the aid of corresponding identifiers 54 in each instance.

Individual aspects of the description presented here in the foregoing can therefore be summarized as follows: a method for operating an automation system 10 having a first and a second central unit 14, 16 and a central unit 14, 16 operating according to the method is specified, wherein the first and the second central unit 14, 16 are connected for communication purposes, wherein a plurality of automation devices 20, 21, 22 is connected to the second central unit 16 for communication purposes and wherein information relating to a plurality of communication channels 46 between the second central unit and a respective automation device 20, 21, 22 is assembled in a communication data record 44, with which information relating to a plurality of communication relationships with communication channels 46 and the respective automation device 20, 21, 21 which can be achieved therewith is automatically transmitted with the aid of the communication data record 44 of the first central unit 14. In particular, if a communication module 48 with a number of slots 50 corresponding to the number of communication channels 46 in the communication data record 44 is created with the aid of the communication data record 44 for the first central unit 14, a simple project planning object is created from complex project planning with the communication module 48 which can be handled like a software module and completely occludes the underlying network structure, also a network structure with mixed topologies. Each slot 50 functions as a network type-dependent virtual representative of the underlying communication channel 46.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of operating a manufacturing automation system having at least a first central unit and a second central unit connected to one another for communication and a plurality of manufacturing automation devices connected to the second central unit for communication, the method comprising:
   providing a communication data record identifying a plurality of communication channels providing communication between the second central unit and a respective manufacturing automation device, and
   automatically transmitting, using said communication data record, channel data identifying said plurality of communication channels between the second central unit and said respective manufacturing automation device that can be accessed using said identified plurality of communication channels to the first central unit using said communication data record,
   providing a communication module for the first central unit, said communication module having inputs corresponding to said respective plurality of the communication channels identified in the communication data record that was automatically transmitted to the first central unit by the second central unit,
   transmitting data from the first central unit to said manufacturing automation device connected for communication to the second central unit by transmitting said data from the first central unit to said communication module using an input to said communication module corresponding to a respective communication channel of said manufacturing automation device, and
   transmitting said data using the communication channel provided by the communication module to the respective manufacturing automation device using the communication channel data from the communication data record.

2. The method of claim 1, wherein the communication data record is automatically compiled from a project planning data record which describes the second central unit, the plurality of manufacturing automation devices connected directly or indirectly to the second central unit and the said plurality of communication channels providing communication between the second central unit and each manufacturing automation device.

3. The method of claim 2, wherein the communication data record is automatically created from the project planning data record data by identifying data in the project planning data record that describe a communication endpoint.

4. The method of claim 1, further comprising the steps:
   assigning, in the information included in the communication data record, a unique identifier to each of the communication channels in said plurality of communication channels between the second central unit and said respective manufacturing automation device,
   causing the first central unit to import the communication data record, and
   transferring respective data of the communication data record to the automation solution for the first central unit using the unique identifier and a corresponding identifier used in an automation solution of the first central unit.

5. The method of claim 4, wherein the channel data of the communication data record are transferred to the automation solution for the first central unit as comments of the automation solution.

6. The method of claim 1, wherein the first central unit is a fail-safe central unit and the communication module is constructed as a fail-safe communication module.

7. A computer program having program code stored on a non-transitory computer-readable medium, said program code being adapted to be executed in an automation system having at least first and second central units, said computer program comprising:

program code configured to provide a communication data record identifying a plurality of communication channels between the second central unit and a respective manufacturing automation device, program code configured to automatically transmit, using said communication data record, channel data to the first central unit identifying said plurality of communication channels between the second central unit and said respective manufacturing automation device that can be accessed using said identified plurality of communication channels using said communication data record, program code configured to provide a communication module for the first central unit, said communication module having inputs corresponding to said respective plurality of the communication channels identified for the second central unit in the communication data record that was transmitted to by the first central unit, program code configured to transmit data from the first central unit to said manufacturing automation device connected to communicate with the second central unit, by transmitting the said data from the first central unit to said communication module using an input to said communication module corresponding to a respective communication channel of said manufacturing automation device, and program code configured to transmit said data using the communication module to the respective manufacturing automation device using the communication channel data from the communication data record.

8. An automation system having at least first and second central units, said automation system comprising:

a memory including a computer program having program code adapted to be executed by the automation system, and a processing unit configured to execute the program code, said computer program including, program code configured to provide a communication data record identifying a plurality of communication channels between the second central unit and a respective manufacturing automation device, and program code configured to automatically transmit, using said communication data record, channel data to the first central unit identifying said plurality of communication channels between the second central unit and said respective manufacturing automation device that can be accessed using said identified plurality of communication channels using said communication data record, program code configured to provide a communication module for the first central unit, said communication module having inputs corresponding to said respective plurality of the communication channels identified for the second central unit in the communication data record that was transmitted by to the first central unit, program code configured to transmit data from the first central unit to said manufacturing automation device connected to communicate with the second central unit, by transmitting said data from the first central unit to said communication module using an input to said communication module corresponding to a respective communication channel of said manufacturing automation device, and program code configured to transmit said data using the communication module to the respective manufacturing automation device using the communication channel data from the communication data record.

* * * * *